US011321186B2

(12) United States Patent
Yevtushenko et al.

(10) Patent No.: US 11,321,186 B2
(45) Date of Patent: May 3, 2022

(54) DATA BACKUP SYSTEM AND METHOD

(71) Applicant: Salvador Technologies Ltd., Qiryat Gat (IL)

(72) Inventors: Alexander Yevtushenko, Qiryat Gat (IL); Oleg Vusiker, Qiryat Gat (IL)

(73) Assignee: SALVADOR TECHNOLOGIES LTD., Qiryat Gat (IL)

( * ) Notice: Subject to any disclaimer, the term of this patent is extended or adjusted under 35 U.S.C. 154(b) by 0 days.

(21) Appl. No.: 16/437,511

(22) Filed: Jun. 11, 2019

(65) Prior Publication Data

US 2019/0391882 A1 Dec. 26, 2019

Related U.S. Application Data

(60) Provisional application No. 62/689,367, filed on Jun. 25, 2018.

(51) Int. Cl.
*G06F 11/14* (2006.01)
*G06F 21/56* (2013.01)

(52) U.S. Cl.
CPC ...... *G06F 11/1464* (2013.01); *G06F 11/1451* (2013.01); *G06F 11/1456* (2013.01); *G06F 11/1461* (2013.01); *G06F 11/1466* (2013.01); *G06F 11/1469* (2013.01); *G06F 21/568* (2013.01); *G06F 2201/84* (2013.01)

(58) Field of Classification Search
CPC ............. G06F 11/1446; G06F 11/1456; G06F 11/1458; G06F 11/1464
USPC ....................................................... 711/162
See application file for complete search history.

(56) References Cited

U.S. PATENT DOCUMENTS

| 5,434,562 | A | * | 7/1995 | Reardon | ............... | G06F 21/567 |
| | | | | | | 713/193 |
| 7,346,790 | B1 | | 3/2008 | Klein | | |
| 9,600,376 | B1 | * | 3/2017 | Krinke, II | ........... | G06F 11/1458 |
| 9,880,776 | B1 | | 1/2018 | Tsaur et al. | | |
| 2008/0134335 | A1 | | 6/2008 | Kameda | | |
| 2009/0292889 | A1 | | 11/2009 | Durfee | | |
| 2010/0192011 | A1 | * | 7/2010 | Largman | ............. | G06F 11/1469 |
| | | | | | | 714/15 |

(Continued)

*Primary Examiner* — Than Nguyen
(74) *Attorney, Agent, or Firm* — Emerson, Thomson & Bennett, LLC; Roger D. Emerson

(57) ABSTRACT

A backup system for backing up data on a computer system, comprising: a plurality of storage devices, the storage devices can be of any type known in the industry such as USB, SATA, SD etc. Storage devices may be built in the device or external devices. The same system may have storage devices that are of the same type (all internal or all external) or a mixture (some internal some external). One or more connector for connecting the plurality of storage devices to the computer system. The storage devices may each have a unique connector (wired or wireless) to the computer system or alternatively, one connector can be connected each time to another storage device. The system also comprises a control module for controlling the connection between the plurality of storage devices to said computer system such that at any given time at least one but not all storage devices are connected to the computer system. The control module selects the storage device or devices to be connected to the computer system according to a predetermined schedule.

20 Claims, 4 Drawing Sheets

(56) References Cited

U.S. PATENT DOCUMENTS

| | | | |
|---|---|---|---|
| 2011/0083165 A1* | 4/2011 | Gopinath | H04W 48/04 |
| | | | 726/4 |
| 2012/0072398 A1 | 3/2012 | Streuter et al. | |
| 2015/0172304 A1 | 6/2015 | Kleezynski | |
| 2017/0031777 A1* | 2/2017 | Wang | H04W 24/02 |
| 2018/0267865 A1* | 9/2018 | Ignomirello | G06F 21/62 |

* cited by examiner

DATA BACKUP SYSTEM AND METHOD

DETAILS OF RELATED APPLICATIONS

This application claims the benefit of U.S. provisional application 62/689,367 filed on 25 Jun. 2018 according to 35 U.S.C. § 119(e) and incorporated herein by reference.

TECHNICAL FIELD

The present invention relates to computer backup general, and in particular to systems and methods for backing up and restoring computer data.

BACKGROUND ART

Computer data needs to be backed up regularly since data may be damaged or lost for a variety of reasons including: accidental or wrong manipulation by a user, equipment malfunction or a malicious attack by a third party. Sensitive or important files may thus be accidentally or intentionally deleted, modified, moved, become unreadable or their access permissions may be changed.

Loss of data or even temporary unavailability of sensitive or critical files may have a severe impact for the data owner be it a business, a government agency, a military agency or even a private user.

Even if the damaged or missing data was backed up, there may still be a negative impact as maybe not all the data was backed up, backup may be an older version that is not up to date, back up may turn out to be damaged too, restoration may be time consuming and require additional resources in terms of network traffic and personnel.

There is thus a need in an industry for robust backup and restoration solutions.

SUMMARY OF INVENTION

It is an object of the present invention to provide a system for backing up computer data (on a computer system) on multiple storage devices.

It is another object of the present invention to provide a system for backing up computer data on multiple storage devices, when not all storage devices are connected to the computer system at any given time.

It is a further object of the present invention to provide a system for backing up computer data on multiple storage devices, when no more than one storage device is connected to the computer system at any given time, and the connected storage device is alternated according to a predetermined schedule.

It is yet another object of the present invention to provide a system that enables a faster data restoration, for example, after a cyber-attack.

The present invention thus relates to a backup system for backing up data on a computer system, comprising:

(i) a plurality of storage devices, the storage devices can be of any type known in the industry such as USB, SATA, SD etc. Storage devices may be built in the device or external devices. The same system may have storage devices that are of the same type (all internal or all external) or a mixture (some internal some external).

(ii) one or more connector for connecting the plurality of storage devices to the computer system. The storage devices may each have a unique connector (wired or wireless) to the computer system or alternatively, one connector can be connected each time to another storage device.

(iii) a control module for controlling the connection between the plurality of storage devices to said computer system such that at any given time at least one but not all storage devices are connected to the computer system. The control module selects the storage device or devices to be connected to the computer system according to a predetermined schedule.

In some embodiments, one or more storage devices are virtual partitions on a same hardware storage device.

In some embodiments, one or more storage devices can be designated as the main (bootable) storage device of the computer system.

In some embodiments, one or more storage devices do not participate in the predetermined schedule and are destined for emergency restoration.

In some embodiments, the backed-up data comprises computer files.

In some embodiments, the backed-up data comprises an image of a computer hard drive.

In some embodiments, the backed-up data comprises a clone of a computer hard drive.

In some embodiments the controller is implemented in a hardware platform comprising: a microcontroller, a programmable logic device (CPLD/FPGA) or a dedicated ASIC.

In some embodiments, the selected storage device or devices remain connected to the computer system.

In some embodiments, the selected storage device or devices are only connected to the computer system when data is backed up.

In another aspect, the present invention relates to a backup computing system comprising at least one processor; and at least one memory communicatively coupled to the at least one processor comprising computer-readable instructions that when executed by the at least one processor cause the backup computing system to implement a method of backing up data from a computer system, the method comprising:

(i) providing a plurality of storage devices having the ability to connect to the computer system;

(ii) connecting according to a predetermined schedule, only a single storage device of said plurality of storage devices to the computer system; and (iii) backing up data from said computer system to the connected storage device.

MODES FOR CARRYING OUT THE INVENTION

Figure 1:
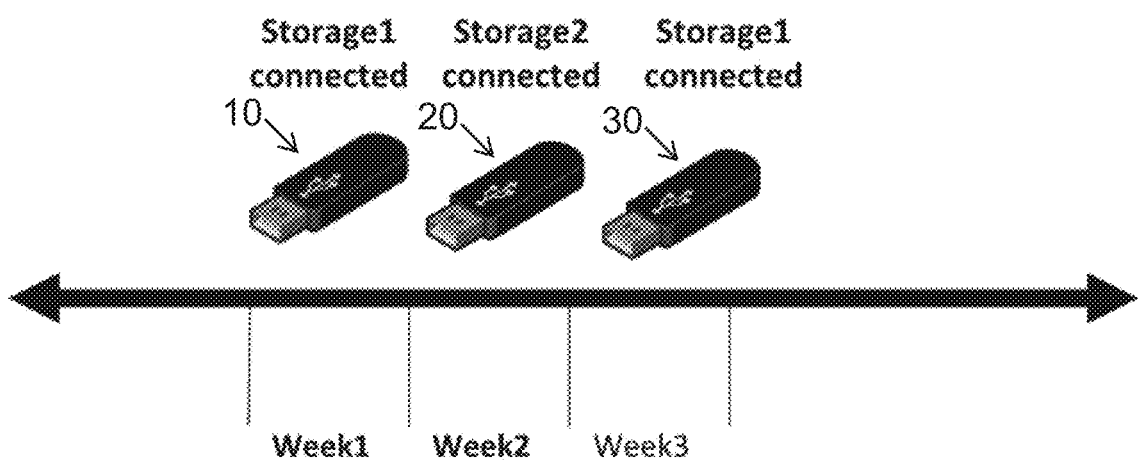
FIG. 1 shows an exemplary embodiment system where the selection of backup storage device is time-based.

In the following detailed description of various embodiments, reference is made to the accompanying drawings that form a part thereof, and in which are shown by way of illustration specific embodiments in which the invention may be practiced. It is understood that other embodiments may be utilized, and structural changes may be made without departing from the scope of the present invention.

The present invention relates to a backup system for backing up data on a computer system. The backup system is used to back-up computer data and to restore part of or all the data, as necessary. A restoration may be required in situations when data was accidentally or maliciously deleted, if a virus has infected the system or if a hacker has taken control of the data and, for example, blocks access to the data unless a ransom is paid.

The backup system comprises a plurality of storage devices, the storage devices can be of any type known in the industry such as Universal Serial Bus (USB), Serial AT Attachment (SATA), Secure Digital (SI)) or any combination thereof. A storage device can be retractable (like a USB device) or permanently connected (like an internal hard-drive). A single system, may comprise storage devices of one or more types.

One or more connectors are used for connecting the plurality of storage devices to the computer system. The storage devices may each have a unique (dedicated) connector (wired or wireless) to the computer system or alternatively, one connector can be connected each time to a selected storage device.

A control module is used for controlling the connection between the plurality of storage devices to the computer system. The control module multiplexes the active connection to the computer system such that at any given time at least one storage device is not connected to the computer system, and thus the data on that storage device cannot be deleted or manipulated from the computer system. In some embodiments, the control module multiplexes the active connection to the computer system such that at any given time no more than one storage device is connected to the computer system. The control module selects the storage device to be connected to the computer system according to a predetermined schedule. In some embodiments only one storage device is connected to the computer system at any given time, in other embodiments several (but not all) storage devices are connected to the computer system at any given time. It could be that one back up operation requires (physically) several storages devices. For example, for backing up a hard drive of 100 GB, the system may use 2 hard drives of 50 GB (or more). In order to protect the backup data against any accidental or intentional manipulation, not all storage devices are connected at any given time.

The control module can receive the time parameter for scheduling the storage device selection by using devices such as an RTC (Real time clock), computer time, network time, manual instructions to activate backup, wireless, GPS, or a special time calculation algorithm. The RTC can be connected to an independent power source such as a battery.

The frequency of the backup can be selected by user, for example, daily backup, weekly backup, continuous backup (every change is immediately backed up) etc. The frequency selection can be done either via a software interface or via a physical switch.

In some embodiments, the control module processes the data before routing it to the selected storage device. Examples of processing actions (one or more processing actions can be performed) include but are not to: encoding the data; verifying the integrity of the data; verifying that the data does not contain malicious code; authenticating the data; and compressing the data.

The control module can thus perform one or more of a processing action before routing the data to the selected storage device.

FIG. 1 shows an example of a scheduling embodiment: the backup system comprises 3 storage devices 10, 20 and 30, each device is connected for one week and then the next device is connected. That is, on week 1 the computer system is connected to storage device 10, on week 2 the computer system is connected to storage device 20, on week 3 the computer system is connected to storage device 30, on week 4 the computer system is connected to storage device 10 again and so on.

It is important to notice that apart from the selected storage device or devices, all other storage devices are not connected to the computer system. These other storage devices have no electrical, wired or wireless connection to the computer system for protection reasons, so that the data they contain cannot be accessed intentionally (for example by a malicious attack) or unintentionally (accidental wrong manipulation by a user). The non-active storage devices may also be powered off when not active for backup. When a storage device's time is reached to become the active storage, it is then turn on and the previous active storage device can be turned off. Turning a storage device on and off can be done either by the control module, by the user (manually turning on or off the storage device) or by both.

In some embodiments, part or all of the data backed up can be further protected by encrypting the backup data and requiring user authentication (by any method of the art) for restoring the data (whether encrypted or not).

The control module can include a "secured remote control" feature, which enables the user to remotely send commands to the control module after authentication. The command can be sent from a host computer or from a remote server. The remote-control module can use different interfaces: USB/LAN/SATA/Wireless etc. The secured remote control can verify (remotely) the timing and quality of each backup operation. In addition, when restoring multiple computers over a network, it is possible to initiate all restorations in a network via a single procedure via the remote control.

In some embodiments, the system can be used for a parallel network recovery. Each computer system in a network can have its own storage device. In case of a computer failure, the recovery process can be done in parallel (decreasing the networks RTO recovery time objective). The command for parallel recovery can be provided by the control module coupled to a main server in the network controlling all the backup storage devices. Parallel recovery is helpful when a cyber-attack touches multiple computers, and in order to save down time, it is more efficient to restore all damaged computer systems in parallel.

The system of the invention can contain an additional multiplexer, in order to determine which hard drive is used as the main (bootable) hard drive of the computer. In case of a failure or cyber-attack, the user can switch the main active hard drive to a backup hard drive and boot the attacked computer system successfully and safely.

In some embodiments, one or more storage devices are virtual partitions on the same hardware storage device. A virtual partition is a software application or a hardware mechanism that emulates one or more hard drives on a single physical hard drive. For other programs a partition acts exactly like a hard drive. For example, a single physical disk, may be portioned to virtual partitions F, G and H. Any program accessing that computer (while all the partitions are active) will see 3 different accessible disks F, G and H. That program will not know if a disk is an external physical disk, an internal physical disk or a virtual partition. The partitioning can be achieved by limiting access to memory areas by checking Msbit addresses before allowing access to and address, thus allowing access only for valid partitions. According to the invention, if virtual partitions are used, only a single partition may be accessible at any given time, and all the other partitions will not be available.

In some embodiments, a storage device can be designated as the main storage device of the computer system. Thus, that device may a bootable hard drive, for example, if the normal bootable hard drive of the computer system is corrupt, non-accessible, non-operational, has a virus etc. In some embodiments, the storage devices can include software applications and tools to help in the restoration process, for example, anti-virus (for cleaning up infected hard drives), recent system updates (patches), recent major updates for popular applications, a firewall etc.

The backup system's architecture can be implemented in a computer hardware solution, for example:
- The control module can be implemented within (or embedded in) a hard disk controller connected to a plurality of redundant storage devices, and implementing a time-based switching mechanism;
- The control module can be a USB controller connected to a plurality of redundant storage devices, and implementing a time-based switching mechanism, wherein the control module automatically switches the active backup storage device(s) based on a predetermined schedule;
- The control module can be a network attached storage (NAS) with time-based switched redundant storage devices.

Figure 2:
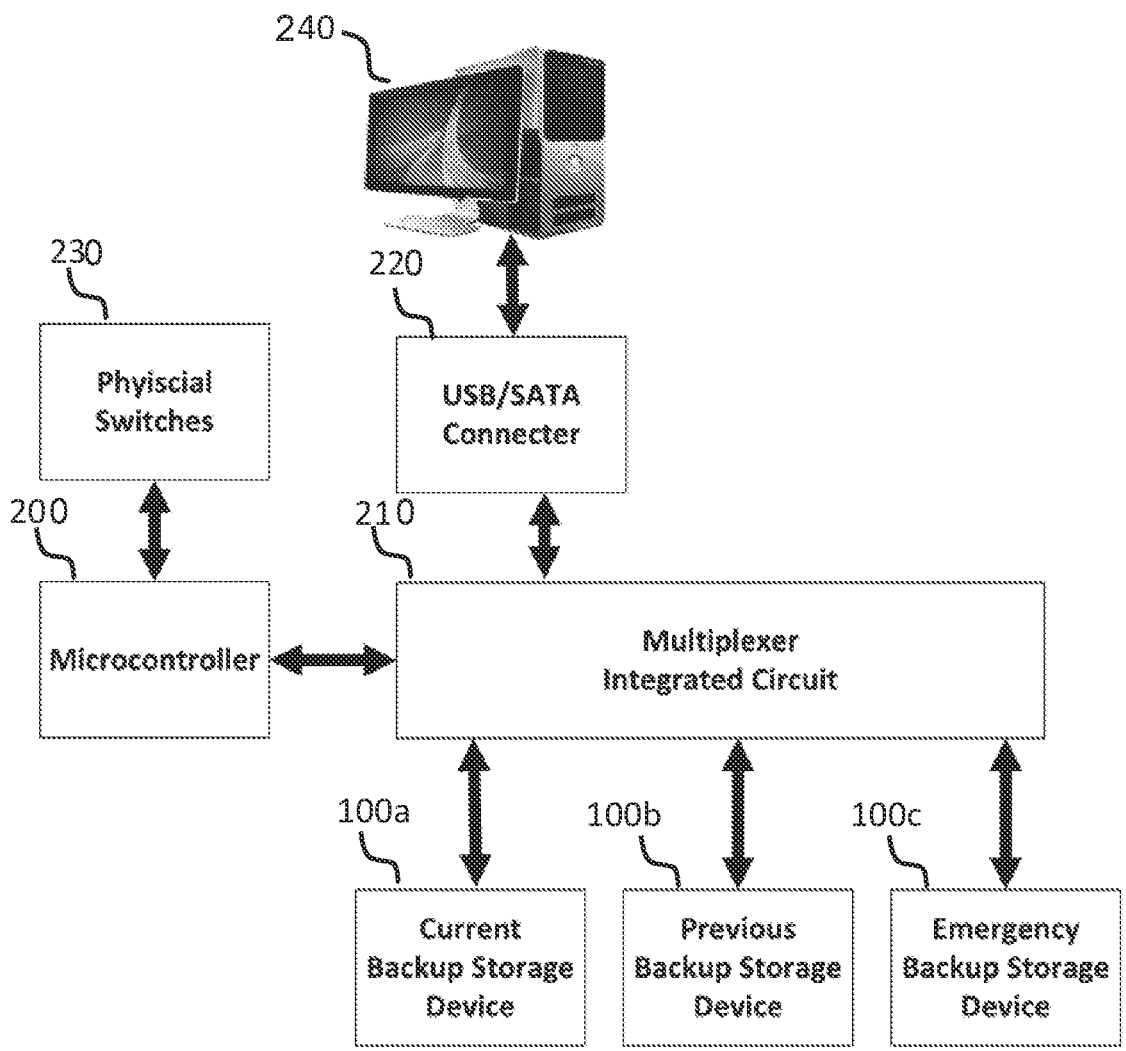
FIG. 2 is a block diagram of an exemplary embodiment of a backup system.

FIG. 2 is a block diagram of an exemplary embodiment of a backup system. In the example of FIG. 2, the control module 200 is implemented via a microcontroller (with an RTC) connected to a multiplexer 210 (implemented by an integrated-circuit) controlling 3 storage devices: 2 storage devices 100a, 100b for routine backup according to the selected backup schedule, and one emergency backup storage device 250 (as described below).

The multiplexer 210 is connected to the computer system 240, for example, via a USB or SATA connector 220. The microcontroller 200 can include physical switches 230, for example, for selecting the backup frequency, connect the emergency storage device 250 etc.

Figure 3:
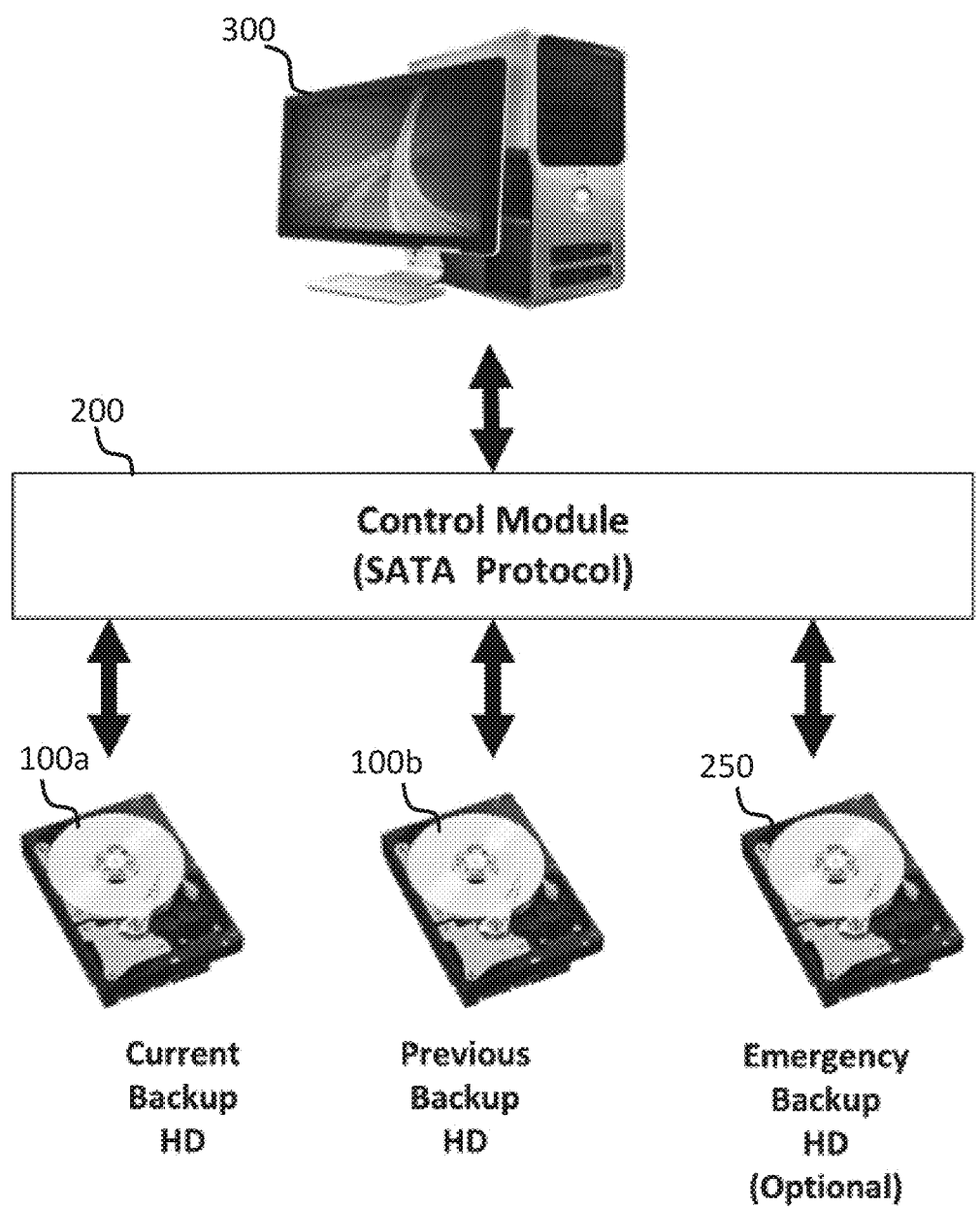
FIG. 3 is a block diagram of an exemplary embodiment of a backup system using hard drives as a backup device.
Figure 4:
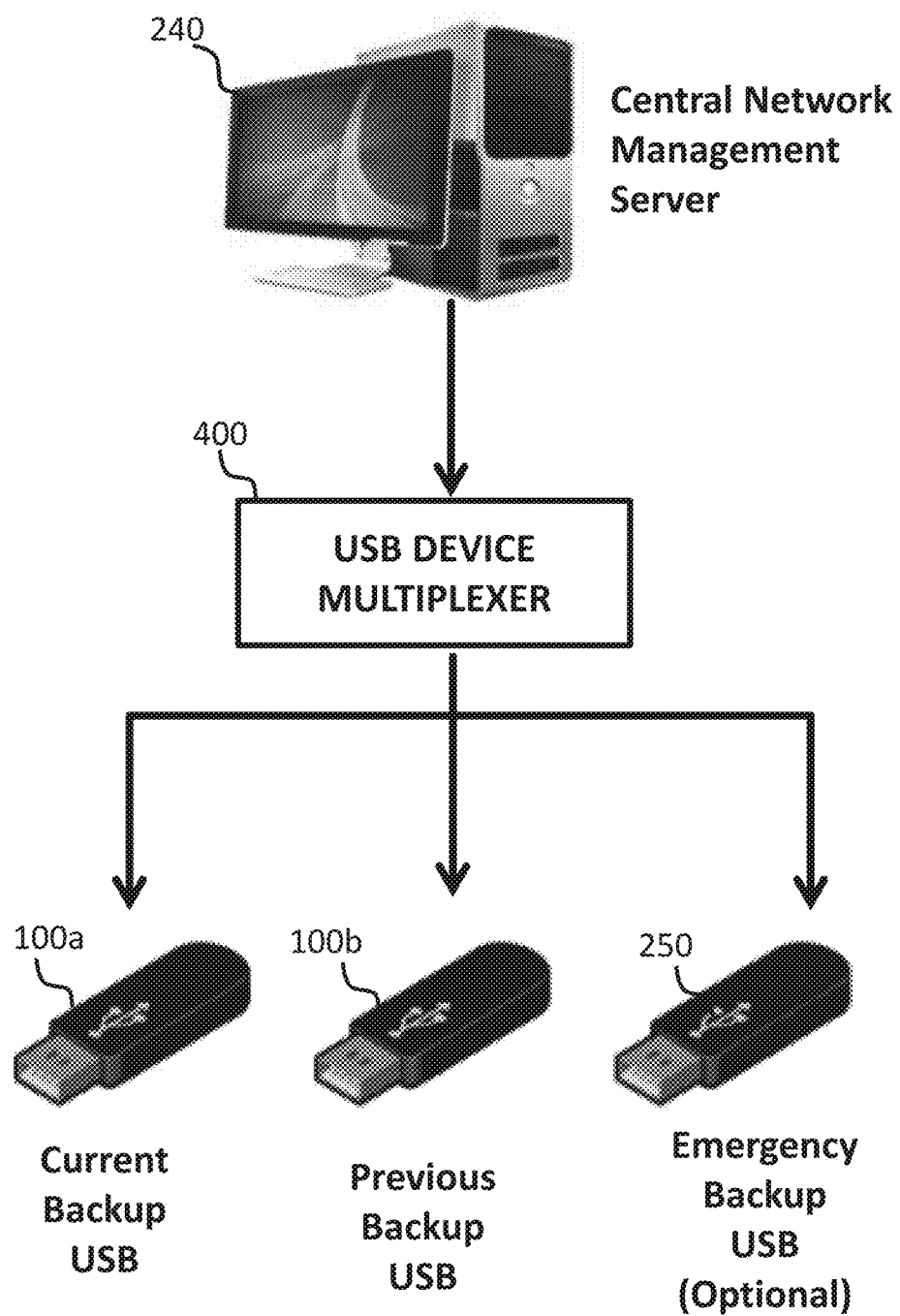
FIG. 4 is a block diagram of an exemplary embodiment of a backup system using USB drives as a backup device.

FIG. 3 is a block diagram of an exemplary embodiment of a backup system using hard drives 100a, 100b as a backup device. Two hard drives 100a, 100b alternate as backup devices and a third emergency backup storage device 250 is used only for an emergency restoration, for example, when the contents of the regular (routing) storage devices 100a, 100b cannot be used (their data is contaminated with a virus, the user has accidentally erased data etc.). The control module 200 is connected to a Supervisory control and data acquisition (SCADA) control computer 300, thus increasing the backup reliability and decreasing the data restoration time, for example, after a cyber-attack. SCADA is a control system architecture for interfacing with the process plant or machinery. Typical SCADA architecture includes programmable logic controllers (PLCs) or remote terminal units (RTUs) to communicate with an array of objects such as factory machines, human-machine interfaces, sensors, and end devices, and then route the information from those objects to computers with SCADA software. The SCADA software processes, distributes, and displays the data, helping operators and other employees analyze the data and make important decisions FIG. 4 is a block diagram of an exemplary embodiment of a backup system using USB drives as a backup device. In this example, the storage devices are USB flash drives, 2 storage devices 100a, 100b alternating for backup (according to the selected backup schedule) and one emergency backup storage device 250 to be used only when the data on the routine storage devices 100a, 100b is damaged or inaccessible.

The storage devices are connected to a USB multiplexer 400 that selects the active storage device for backup, in this example, 100a, 100b though in practice there is no limit on the number of storage devices that can alternate as backup devices. Preferably, only one of the storage devices can be connected to the computer at any given time such that the data integrity of the other backup devices is not jeopardized. The selected backup storage device may be connected to the computer system 240 for the entire scheduled period or only be connected when the actual backup operation takes place. That is, if, for example, the backup storage devices are alternated daily, for a daily backup at 16:00. The active backup storage device may be connected to the computer 240 the entire day and backup performed at the schedule hour (16:00 in this example). Alternatively, the storage device may be disconnected during the day, connected at 16:00 for performing the backup operation, and then immediately disconnected again once the backup operation is completed. The connection/disconnection of the storage device can be performed by the controller 200 or done manually by the user.

When a user wants to restore his computer 240, he can choose to boot from one of the storage devices (during the startup by using BIOS/UEFI). In this case, rescue software will copy the hard drive sectors from the USB drive to the computer hard drive.

If the restoration is performed from a storage device that contains a clone of the target hard drive, the user can continue to work from the backup device as a main storage instead of the damaged one. The damaged hard drive can be recovered afterwards.

In some embodiments, one storage device 250 does not participate in the predetermined schedule and is destined for emergency restoration. This storage device can be designated as an emergency backup 250. There could be a case that all the regular storage devices (participating in the routine backup schedule) are unsuitable. For example, assuming (as in FIG. 1) 3 regular storage devices 10, 20, 30, each being active for one week. This means that the user may restore data from the last 3 weeks. If a file has been deleted by mistake and only discovered after 5 weeks, the file won't be present in any of the 3 storage devices 10, 20, 30. Similarly, if a virus has infected the computer system 240, but has been discovered after more than 2 weeks, all the 3 backup storage devices 10, 20, 30 will be contaminated with the virus. For those types of scenarios, a designated emergency storage device 250, can be backed up, say every 6 or 12 months for example, and can be accessed if the current storage devices cannot be used for restoration.

The emergency storage device 250 does not participate in the routine backup schedule of the computer system, and is not connected to the computer system 240, so its data cannot be manipulated either intentionally by a malware or unintentionally by an erroneous user manipulation.

In some embodiments, the emergency storage device 250 can only be connected after a user manipulation such as powering the device on, connecting the cable and/or a software authentication, in order to protect the integrity of the data in the emergency storage device 250.

In some embodiments, the backed-up data comprises computer files such as text, images, audio, video, binary files, system files or any combination thereof.

In some embodiments, the backed-up data comprises an image of a computer disk. An image of a computer hard drive is a computer file containing the contents and structure of that disk volume or of an entire data storage device.

In some embodiments, the backed-up data comprises a clone of a computer hard drive. Disk cloning is the act of copying the contents of a computer's hard drive. Disk cloning may use an image file.

In some embodiments, the controller is implemented in a hardware platform comprising: a microcontroller, a programmable logic device (CPLD/FPGA) or a dedicated ASIC.

In some embodiments, the selected storage device remains connected to the computer system.

In some embodiments, the selected storage device is only connected to the computer system when data is backed up.

In some embodiments, the backup system can be used for recovery of a computer network that was attacked by a virus. The backup device contains images of the computer systems 240 in the network in addition to deployment software in order to restore the computer systems 240.

In another aspect, the present invention relates to a backup computing system comprising at least one processor; and at least one memory communicatively coupled to the at least one processor comprising computer-readable instructions that when executed by the at least one processor cause the backup computing system to implement a method of backing up data from a computer system, the method comprising:

(i) providing a plurality of storage devices having the ability to connect to the computer system;

(ii) connecting according to a predetermined schedule, only a single storage device of said plurality of storage devices to the computer system; and (iii) backing up data from said computer system to the connected storage device.

Although the invention has been described in detail, nevertheless changes and modifications, which do not depart from the teachings of the present invention, will be evident to those skilled in the art. Such changes and modifications are deemed to come within the purview of the present invention and the appended claims.

It will be readily apparent that the various methods and algorithms described herein may be implemented by, e.g., appropriately programmed general purpose computers and computing devices. Typically, a processor (e.g., one or more microprocessors) will receive instructions from a memory or like device, and execute those instructions, thereby performing one or more processes defined by those instructions. Further, programs that implement such methods and algorithms may be stored and transmitted using a variety of media in a number of manners. In some embodiments, hard-wired circuitry or custom hardware may be used in place of, or in combination with, software instructions for implementation of the processes of various embodiments. Thus, embodiments are not limited to any specific combination of hardware and software.

A "processor" means any one or more microprocessors, central processing units (CPUs), computing devices, microcontrollers, digital signal processors, or like devices.

The term "computer-readable medium" refers to any medium that participates in providing data (e.g., instructions) which may be read by a computer, a processor or a like device. Such a medium may take many forms, including but not limited to, non-volatile media, volatile media, and transmission media. Non-volatile media include, for example, optical or magnetic disks and other persistent memory. Volatile media include dynamic random-access memory (DRAM), which typically constitutes the main memory. Transmission media include coaxial cables, copper wire and fiber optics, including the wires that comprise a system bus coupled to the processor. Transmission media may include or convey acoustic waves, light waves and electromagnetic emissions, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, a carrier wave as described hereinafter, or any other medium from which a computer can read.

Various forms of computer readable media may be involved in carrying sequences of instructions to a processor. For example, sequences of instruction (i) may be delivered from RAM to a processor, (ii) may be carried over a wireless transmission medium, and/or (iii) may be formatted according to numerous formats, standards or protocols, such as Bluetooth, TDMA, CDMA, 3G.

Where databases are described, it will be understood by one of ordinary skill in the art that (i) alternative database structures to those described may be readily employed, and (ii) other memory structures besides databases may be readily employed. Any illustrations or descriptions of any sample databases presented herein are illustrative arrangements for stored representations of information. Any number of other arrangements may be employed besides those suggested by, e.g., tables illustrated in drawings or elsewhere. Similarly, any illustrated entries of the databases represent exemplary information only; one of ordinary skill in the art will understand that the number and content of the entries can be different from those described herein. Further, despite any depiction of the databases as tables, other formats (including relational databases, object-based models and/or distributed databases) could be used to store and manipulate the data types described herein. Likewise, object methods or behaviors of a database can be used to implement various processes, such as the described herein. In addition, the databases may, in a known manner, be stored locally or remotely from a device which accesses data in such a database.

The present invention can be configured to work in a network environment including a computer that is in communication, via a communications network, with one or more devices. The computer may communicate with the devices directly or indirectly, via a wired or wireless medium such as the Internet, LAN, WAN or Ethernet, Token Ring, or via any appropriate communications means or combination of communications means. Each of the devices may comprise computers, such as those based on the Intel® Pentium® or Centrino™ processor, that are adapted to communicate with the computer. Any number and type of machines may be in communication with the computer.

The invention claimed is:

1. A backup system for backing up data on a computer system, comprising:
   (i) a plurality of backup storage devices;
   (ii) a multiplexer for selecting an active backup storage device, from said plurality of backup devices, said multiplexer connected by one or more data connectors to said plurality of backup storage devices, and also connected by a data connector to said computer system, and
   (iii) a control module comprising a microcontroller with its own Real-Time Clock (RTC), physical switches to select the active backup storage device and select the backup frequency, said control module connected to said multiplexer by a control connector, such that said microcontroller cannot receive instructions from said computer, for controlling the connection between said plurality of backup storage devices and said computer system such that at any given time no more than one active backup storage device has a wired or wireless connection to the computer system and the remaining backup storage devices are not connected to said computer system via a wired or wireless connection and the data on the remaining backup storage devices is not accessible via the computer system and selecting the active backup storage device and the backup frequency is controlled by said physical switches that cannot be controlled by the computer system.

2. The backup system according to claim 1, wherein one or more backup storage devices are virtual partitions on a same hardware storage device.

3. The backup system according to claim 1, wherein when the computer system's bootable hard drive is non-operational, a backup storage device can be designated as the bootable storage device of the computer system.

4. The backup system according to claim 1, wherein one backup storage device does not participate in the predetermined schedule and is destined for emergency restoration.

5. The backup system according to claim 1, wherein the backed-up data comprises an image of a computer hard drive.

6. The backup system according to claim 1, wherein the backed-up data comprises a clone of a computer hard drive.

7. The backup system according to claim 1, wherein the controller is implemented in a hardware platform comprising, a microcontroller, a programmable logic device (CPLD/FPGA) or a dedicated ASIC.

8. The backup system according to claim 1, wherein the selected backup storage device remains connected to the computer system.

9. The backup system according to claim 1, wherein the selected backup storage device is only connected to the computer system when data is backed up.

10. The backup system according to claim 1, wherein the control module performs one or more processing actions on received data, before said data is routed to a backup storage device.

11. The backup system according to claim 10, wherein said one or more processing actions comprise verifying the integrity of the data; verifying that the data does not contain malicious code; or authenticating the data.

12. The backup system according to claim 10, wherein said one or more processing actions comprise encoding the data or compressing the data.

13. A backup computing system comprising:
at least one processor; and
at least one non-transitory memory communicatively coupled to the at least one processor comprising computer-readable instructions that when executed by the at least one processor cause the computing system to implement a method of backing up data from a computer system, the method comprising:
(i) providing a plurality of backup storage devices having the ability to connect to the computer system via a wired or wireless connection;
(ii) connecting a multiplexer by one or more data connectors to said plurality of backup storage devices, and also connecting said multiplexer to said computer system by a data connector;
(iii) connecting a control module to said multiplexer by a control connector, for selecting an active backup storage device, wherein the selection of the active backup device and the backup frequency are determined by physical switches on said control module independent of said computer system, and only a single backup storage device of said plurality of storage devices can be connected to the computer system, such that the remaining backup storage devices are not connected to the computer system via a wired or wireless connection and the data on the remaining backup storage devices is not accessible via the computer system; and
(iv) backing up data from said computer system to the connected active backup storage device.

14. The backup computing system according to claim 13, wherein a backup storage device can replace the mam storage device of the computer system during a restoration process.

15. The backup computing system according to claim 13, wherein one backup storage device does not participate in the predetermined schedule and is destined for emergency restoration.

16. The backup computing system according to claim 13, wherein the backed-up data comprises an image of a computer hard drive.

17. The backup computing system according to claim 13, wherein the backed-up data comprises a clone of a computer hard drive.

18. The backup computing system according to claim 13, wherein the controller is implemented in a hardware platform comprising, a microcontroller, a programmable logic device (CPLD/FPGA) or a dedicated ASIC.

19. The backup computing system according to claim 13, wherein the selected backup storage device is only connected to the computer system when data is backed up.

20. A backup system for backing up data on a computer system, comprising:
(i) a plurality of backup storage devices;
(ii) a multiplexer for selecting an active backup storage device, from said plurality of backup devices, said multiplexer connected by one or more data connectors to said plurality of backup storage devices, and also connected by a data connector to said computer system via a wired or wireless connection; and
(iii) a control module comprising a microcontroller with its own Real-Time Clock (RTC)), physical switches to select the active backup storage device and select the backup frequency, said control module connected to said multiplexer by a control connector, such that said microcontroller cannot receive instructions from said computer, for controlling the connection between said plurality of backup storage devices and said computer system, wherein according to a predetermined schedule said control module connects only one of said plurality of backup storage devices to the computer when the actual backup operation takes place, and disconnects the selected backup storage device from the computer once the backup operation is completed, and the remaining storage backup devices are not connected to the computer system via a wired or wireless connection and the data on the remaining backup storage devices is not accessible from said computer system.

* * * * *